Oct. 1, 1929. B. C. STICKNEY 1,729,804
INTERNAL COMBUSTION ENGINE
Filed Feb. 18, 1927 2 Sheets-Sheet 1

INVENTOR
Burnham C. Stickney

Patented Oct. 1, 1929

1,729,804

UNITED STATES PATENT OFFICE

BURNHAM C. STICKNEY, OF PORTSMOUTH, NEW HAMPSHIRE

INTERNAL-COMBUSTION ENGINE

Application filed February 18, 1927. Serial No. 169,284.

This invention relates to internal combustion engines of the general type usually designated as "two cycle," in which, at the conclusion of the driving or explosion stroke of the piston, a charge of vaporized fuel is usually forced into the cylinder with the effect of forcing out a part of the exhaust-gas therefrom, whereby the cylinder becomes charged with a mixture of vaporized fuel and exhaust-gas. This mixture is compressed upon the return stroke of the piston, and fired by a spark-plug or other suitable means, thus making an explosion-stroke for each revolution of the crank-shaft of the engine.

One of the objects of the present invention is to minimize the waste of fuel through the exhaust-port during the inlet of mixed air and fuel, prior to compression. Heretofore it has been the practice to moderate this waste by providing a baffle upon the piston-head. This baffle is usually close to the inlet-port in the cylinder, and reflects the incoming charge upwardly, and the gas that escapes through the exhaust-port consists mainly of burned gas with only a moderate amount of the fresh fuel-gas; the exhaust-port being also at the bottom and placed upon the opposite side of the cylinder from the inlet in order to favor this attempt at saving fuel. Partly on this account, also, the necessity has existed of keeping the pressure of the intake-gas at a low point, and flexibility of power and speed have been impracticable.

To accomplish the object of more effectually avoiding waste of fresh gas, the engine-cylinder disclosed herein is provided with only an exhaust-port. A second cylinder, in which also work a piston, is provided only with an inlet-port. The cylinders are preferably side by side. The ports in the bottoms of these cylinders open at the concluding portions of the driving strokes of the respective pistons therein. The cylinders are connected by a conduit, only at their tops. Hence the two cylinders, with the intermediate conduit, constitute a race. At one end of this race is the inlet-port, and at the other end is the exhaust-port. Fresh gas cannot therefore be wasted through the exhaust-port, without first flowing the entire length of the race. The fresh gas rams the burned gas out of the engine, leaving the race full of fresh gas, but the exhaust-port is quickly closed due to the running of the engine, and at the moment of its closing there is but little burned gas remaining therein, no more than is desirable for economical and satisfactory running of the engine. Thus the charge of fuel-gas, forced through the inlet-port into one cylinder, must flow up through said cylinder, sweeping the burned gas up before it, and then flow across and then down into the other cylinder, driving the exhaust-gas down and out of the exhaust-port. During this sweeping action, the pistons complete their driving or down strokes and also perform the first portions of their up-strokes, so that by the time the exhaust-port is closed as aforesaid, both cylinders and the conduit are filled with gas, which is mainly fresh fuel-gas. It mixes somewhat with the final residuum of burned gas, but little or no fuel-gas wastes through the exhaust-port.

Said pistons are connected by links or pitmen to the same wrist of the crankshaft, and they rise together, and co-operate in the compression of the charge, which begins at the time that the exhaust-port is closed. The compression of the charge common to the two cylinders is effected by the time the pistons reach the tops of their strokes. The explosion-chamber may consist principally of the passage or conduit which leads from the top of one cylinder to the top of the other cylinder, and its cubic capacity may equal say one-fourth or one-fifth of the combined cubic displacement of the pistons. In this explosion-chamber is placed a spark-plug for the purpose of igniting the charge, although the invention is not limited to this method of ignition.

The engine with the two pistons is thus made more efficient as compared with an ordinary two-cycle engine, which usually has a single cylinder and single piston, if the displacement of the single piston is equal to the combined displacement of the twin pistons of the present invention. The invention, however, is not limited to the use of two pistons in a group, as it will be seen that a plurality of cylinders may be connected to a crank-wrist, and fed by one intake-port and discharged by one exhaust-port, said ports being at extreme ends of said race.

The length of the race, or the distance from the intake-port in one cylinder to the exhaust-port in the other cylinder, is equal to the effective length of the exhaust-cylinder plus the effective length of the intake-cylinder, plus the length of the connecting conduit or explosion-chamber. The race is therefore more than double the effective or compression-effecting length of the exhaust-cylinder. Since the race has the intake-port at one end thereof and the outlet-port at the other end thereof, and since the charge of fresh gas runs in only one direction, it has but little opportunity to mix with the exhaust-gas, which is pushed before it, and thus the fresh charge has little or no opportunity to escape through the exhaust-port.

This arrangement of intake-cylinder combined with exhaust-cylinder, removes the restriction upon speed, power and flexibility heretofore imposed by the aforesaid arrangement of intake and exhaust ports and piston-baffle, with its unavoidable general mixing and waste of fresh gas with the escaping burned gas. Fresh fuel-mixture may enter the engine under much higher pressure (with greater power and greater speed) than heretofore usual in the two-cycle engine. The pressure of the entering charge may be from say 2 to 20 pounds, and is constant. A substantial range of pressure of incoming mixture is secured.

The spark-plug may be placed in the explosion-chamber at the head of the intake-cylinder, where it will act upon the freshest portion of the compressed gas.

Another feature is the connecting up of the pistons in a two-cycle engine in an efficient manner to a crank-shaft, and eliminating the necessity of providing an individual crank-case for each engine-cylinder. This advantage is gained by using the common charger for all the cylinders.

Two pistons may be connected to one wrist of a two-throw crank-shaft, and two other pistons may be connected to the other wrist of said shaft, so that the four pistons give two impulses at each engine-revolution.

To the same wrists may be connected the pistons of four other cylinders, which may extend at right angles relatively to the four first mentioned, thereby giving two more impulses to the crank-shaft at each revolution, making four evenly-spaced impulses for each revolution of the crank-shaft. The four pistons in each set may be cast in line, those in one pair or group being connected to one wrist and those in the other pair being connected to the opposite wrist.

Another object is to gain flexibility of both speed and power in a two-cycle engine, which has been heretofore restricted to a fuel-supply which by means of the engine-piston is pumped through the crank-case. A further object is to increase the power of the engine. Each fresh charge has been heretofore derived from the previous piston-stroke, and has been correspondingly limited as to pressure, volume and speed of charging. It is one of the features of the present improvements that charges of mixed fuel and air are forced into the engine, preferably under constant pressure, thus securing efficient scavenging of burned gas and ample supply of fresh fuel. If desired the cylinders may all be entirely filled with fresh fuel, as when the engine is driving or carrying an overload. Or say one-fifth of the burned gas may remain in the cylinders and form a mixture with the fresh fuel.

The engine drives a pump or the like which preferably draws the mixture of air and fuel through any suitable carburetor, and forces it through the intake-port of the engine. This assures an ample charge and also speed of scavenging and recharging, permitting high speed of the novel engine, as well as increasing the power of each stroke of the pistons at low and high speeds. The pump or charger is regulatable, delivering the fuel under higher or lower pressure to the intake-cylinder of the engine. Depending partly upon the speed of the engine and partly upon the pressure of the incoming fuel, either both cylinders may be filled with the charge, or the exhaust-cylinder may be only partly filled, or if desired no fresh fuel may reach the exhaust-cylinder, but it may remain filled with burned gas. But the fresh gas in the intake-cylinder will ignite at the conclusion of the compression-stroke, the spark-plug being placed in or close to the intake-cylinder for this purpose. The intake-cylinder need not fill with fresh gas, especially with light engine-loads, so long as enough is admitted to insure firing. The power of the engine at a given speed may in this way alone be cut down to one-half or one-third of its maximum. Further regulation and variation of speed and power is afforded by way of a pedal, "accelerator" or throttle which opens a butterfly-valve between the pump or charger and the engine.

Other features and advantages will hereinafter appear.

Figures 1, 2, 3:
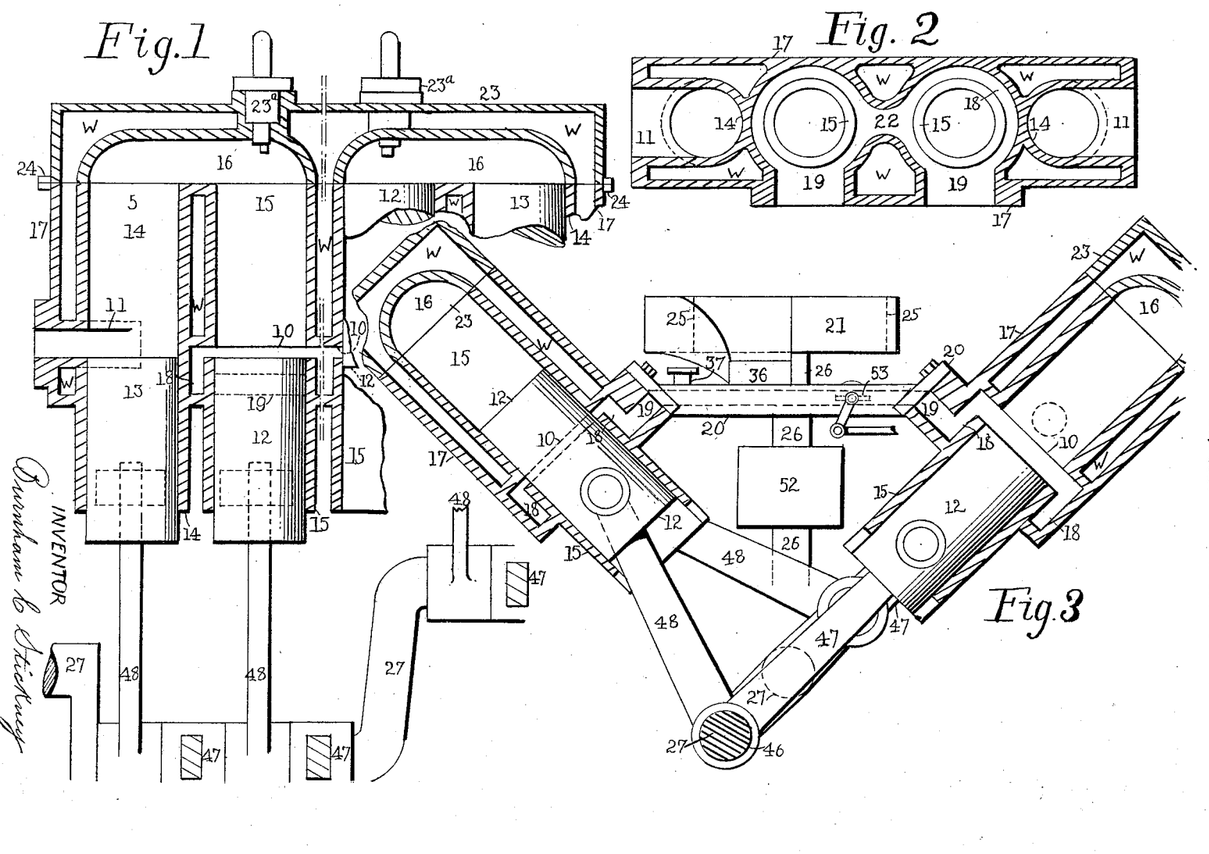
Figure 1 is a sectional view of one group of four cylinders, taken axially of the cylinders, showing the pistons in extreme positions.
Figure 2 is a plan of an engine-head having one group of cylinders, showing the intake-ports and the exhaust-ports.
Figure 3 is a cross-sectional elevation, showing pistons set at an angle of 90° connected to crank-wrists set at 180°.

The relationship of the intake and exhaust ports 10, 11, and of the pistons 12, 13 in each couple or combination, is seen at Figure 1, in which an intake-cylinder 14 and an exhaust-cylinder 15 stand side by side. These cylinders are separate, but have an open communication at their tops by means of a transverse conduit 16, which constitutes a compression or explosion chamber, common to the cylinders, as seen at either the left-hand side or the right-hand side of Figure 1. At the right-hand side the pistons are shown at the tops of their compression strokes. At the left-hand side of said Figure 1, the pistons are shown at the bottoms of their power-strokes, with both intake and exhaust ports open.

As the left-hand piston 13 in the left-hand couple at Figure 1 near the bottom of its power-stroke, it opens exhaust-port 11, which may be cast in the cylinder-head 17 and may be of quite ample dimensions (see also Figure 2) as compared with exhaust-ports of previous two-cycle engines, in which it has been difficult to provide for quick exhaust without undue loss of fresh fuel through the exhaust-port. Exhaust-port 11 may be equal in width to the diameter of the cylinder 14, Figure 2, and its timing is such that in its opening it may have a lead of fifty degrees or more, depending partly upon the speed of the engine, whereby this large port may be open through say one hundred degrees of revolution of the crank-shaft, giving ample opportunity for the fresh charge of gas, entering through the intake-port 10, to fill the intake-cylinder 14 and also the main portion of the exhaust-cylinder 15, before the exhaust-port 11 closes. The two cylinders 14, 15, with the connecting compression-chamber 16, form an inverted U-shaped race. It will be seen that the port 10 at the bottom of the intake-cylinder may be much less in height than the exhaust-port 11, thus giving an opportunity for much of the exhaust gas to escape, and for its pressure and heat to be much reduced, before the descending intake-piston 12 uncovers the intake-port 10, and hence before the fresh gas is exposed to the heat of the exhaust gas, whereby the danger of backfiring or premature explosion is minimized.

At the time that the intake-port 10 opens, the pressure of exhaust gas may slightly overbalance the moderate pressure of the fresh gas which is being offered; and in that case, the supply of fresh gas will be crowded back towards the bottom of an annular chamber 18, which is formed in the cylinder casting below or out of line with the intake-port 10, and extends around the cylinder and has at its lower portion an inlet-orifice 19 from an intake-manifold 20, through which the charge of mixed air and gas is supplied under pressure by means of a pump, blower or charger 21. This pressing back of the intake charge, however, can be only for an instant, and, as the burned-gas pressure continues to weaken, it is overcome by the pressure of the fresh gas, and is quickly forced up the intake-cylinder and over through the explosion chamber and down through the exhaust-cylinder to its port; the proportions of the mixture of fresh gas and burned gas at this time being determined partly by the speed of the engine, partly by the relative capacity of the explosion or compression-chamber (that is, by the extent to which the charge is compressed before explosion), partly by the intake-regulators, and partly by the capacity of the intake-port, and its timing relatively to the exhaust-port. The intake is preferably closed while the exhaust port still remains about half open, so that the intake charge, which is delivered under moderate constant compression, may continue expanding after the close of the intake-port, and complete the scavenging of the exhaust gas (as far as desired) before the exhaust-port also becomes closed.

The intake-port 10 is of slight height (although it may be as high as shown in the cylinder at the right of Figure 3) so as to permit considerable pre-exhaust of burned gas through the partly open exhaust-port 11, and so as to close on the upstroke of the piston 12 before an excess of gas could enter the engine; the scavenging, however, continuing after the inlet-port closes, by reason of the momentary expansion of the fresh gas already admitted, such expansion and scavenging continuing until the exhaust-port 11 closes and compression begins. The intake-port 10 is preferably continued uninterruptedly all around the cylinder, to give it sufficient capacity notwithstanding its narrowness.

The two intake-cylinders 14 in the group may be placed adjacent each other, and may have the common intake-manifold 20 placed at the side of the engine-head 17; the exhaust-ports 11 opening at the ends of the engine-head or otherwise, or if desired into an exhaust-manifold that may extend along one side of the engine-head. The intake-cylinder 14 in the right-hand couple or group at Figures 1 and 2, is provided with a similar annular pocket or chamber 18, which may have a similar inlet 19 from the intake-manifold 20, and the intake-port 10 of this cylinder may be closed by its piston 12 while the intake-port 10 of the adjoining cylinder 15 is open, Figure 1. Said annular inlet-pockets 18 may communicate with each other, at 22, so that each cylinder has the benefit of both feeding passages 19. The cylinder groups may be cast within a water-jacketing, and the engine-head may be provided with a detachable cap 23 secured thereto by flanges 24, the compression-chambers and spark-plugs 23ª being in the cap. Water-spaces are indicated by the letter W. The pockets 18 taken with the passage 22 and inlets 19 form a chamber through which extend adjacent inlet cylinders 14. The chamber entirely surrounds the cylinders, which on every side open into the chamber, and affords an immediate reservoir for aiding in charging each cylinder. The chamber underlies the water-jackets of the cylinders.

The intake-manifold 20 may extend horizontally between the inclined engine-heads 17, Figure 3, and may be attached to both engine-heads, each of which has inlet-orifices 19.

This manifold 20 may be supplied with a compressed charge of mixed air and fuel by means of blower 21, which may correspond in construction to the blower which is used on the Renault air-jacketed cylinder aviation motor; whereof the revolving fan is indicated at 25, being connected to the top of a vertical shaft 26 which may be connected to the crank-shaft 27 by speed-multiplying gearing 28, 29. The charger may, if desired, be in the form of a high-pressure rotary pump, such as shown for instance in the patent to Machlet 902,501 or 1,119,972. The charger, of any suitable type, draws the mixed charge of air and fuel from the delivery end or top of a carburetor 30 of any suitable type; a Stromberg Model "O" carburetor being indicated at Figure 4, having an intake 31, a Venturi casing 32 and a float-chamber 33 and the usual choke 34 and other appurtenances. The air may be supplied from a stove or other heater to the carburetor-intake in the usual manner, and may pass through a conduit 35 to the intake side of the blower or compressor 21, and may be delivered thence through a pipe 36 to the intake-manifold 20, which may be provided with a safety valve 37 to prevent injury in case of back-firing or premature explosion, although the safety valve may not be deemed necessary, since the outlet-port 11 is preferably still open throughout the entire period during which back-firing can occur through the intake-manifold. The gasoline supply to the carburetor is indicated at 38, and also a vacuum tube 39 leading from the carburetor conduit 35 back to the usual Stewart vacuum tank 40, which supplies the carburetor with gasoline through 38.

The charger 21 may be provided with a by-pass 41, in which may be placed a butterfly-valve 42, to control the pressure of charge delivered to the engine. This valve 42 controls the extent to which the blower 21 forces the charge around in a circuit. The charge is at low pressure when valve 42 is wide open, as at Figure 4. To increase the pressure of the mixture delivered to the intake-manifold 20, this valve 42 may be closed more or less by means of a link 43, which may be controlled by the driver of the automobile, either by a pedal or by a hand-lever, or both. A butterfly-valve 44 is also provided in the supply pipe to the manifold, for reducing or increasing the supply of fuel to the engine and for other purposes, Figure 4.

Figures 4, 5:
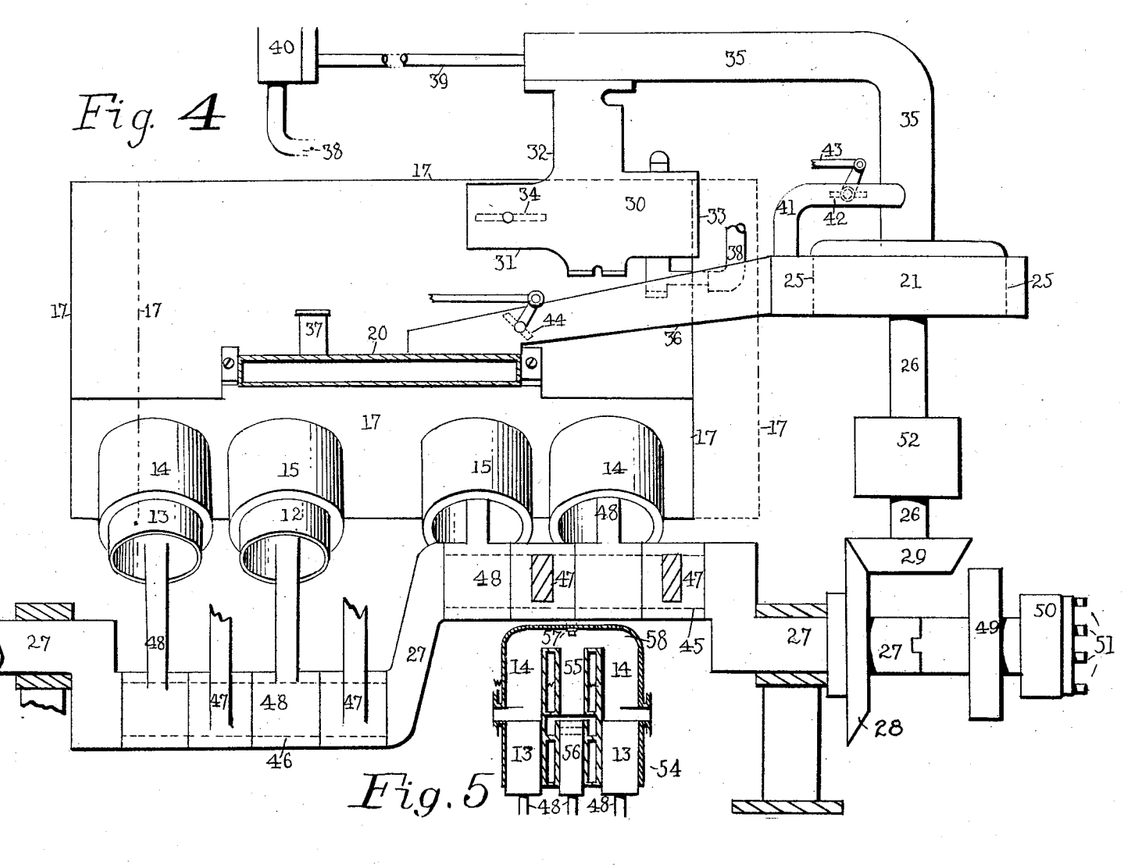
Figure 4 is a sectional elevation taken alongside of the crank-shaft, and showing the left-hand inclined cylinder-head and some of the devices driven by the crank-shaft, including the fuel-charger or compressor working between the carburetor and the intake-manifold.
Figure 5 shows the intake-cylinder of smaller diameter than an exhaust-cylinder, to increase the range of flexibility of the engine. This range can be further increased by combining one intake-cylinder (preferably of small diameter) with two exhaust-cylinders, all connected to one crank-wrist.

As also seen at Figure 4, each wrist 45, 46 of the crank-shaft carries four pitmen, two of them (47) to cylinders in the right-hand group, and two (48) to cylinders in the left-hand group at Figure 3, whereby the drive strokes of two pistons are received by the crank-shaft 27 at every fourth of a revolution thereof. The effect upon the crank-shaft is the same as if the pistons composing each pair were a single piston, having the aggregate area of said pair. The splitting-up of the old single piston into two in this manner gives the advantage of placing and forming the exhaust-port where it will have maximum efficiency, and placing and forming the intake-port in such a manner that the exhaust gas can be scavenged with little or no loss of fresh fuel, with the other advantages also enumerated. The use of only two wrists for eight pistons is an advantage in a two-cycle engine, in shortening the crank-shaft and balancing and even driving and smooth running of the engine.

The crank-shaft 27 may carry a pump 49 and also a distributor 50, which may have four outlets 51, producing four equally spaced sparks at each revolution of the shaft; and the blower-shaft 21 may be equipped with a generator 52 connected to the usual electric battery for the usual purpose.

The supply of fuel may be substantially reduced (or cut off entirely if desired) from the cylinders at one side of the engine, while those on the other side are run economically at full power. This may be done by means of a butterfly-valve 53 in the manifold. Thus all eight cylinders may be used in carrying a heavy load, or climbing a hill, or starting the car; while half of them may be practically cut off when the load on the engine is moderate, as when traveling at fair speed on a level road.

At Figure 5 is shown a triple-cylinder combination 54, which may take the place of each twin-cylinder arrangement shown in the other views. This triplet combination gives great flexibility, because it may use three cylinders 14, 55, 14 full of fresh fuel at each power stroke, or only the middle (intake) cylinder 55 may be full, depending largely upon the pressure at which the fuel is supplied to the engine. The middle or intake cylinder 55 (corresponding with 15) being full, its gas is compressed at the up-stroke of the three pistons, 13, 56, 13, and fired by the spark-plug 57 which is placed in the long explosion chamber 58 over the middle cylinder 55. The pressure resulting from the explosion is exerted on all three pistons. This conduces to economy of fuel, as well as flexibility of the engine. The intake-cylinders in all the views may be of smaller diameter than the exhaust-cylinders, as at 55, Figure 5, to conduce to economy and flexibility, as will be understood, since the quantity of fresh gas, necessary in order to be capable of firing by the spark-plug, is reduced.

Variations may be resorted to within the scope of the invention, and portions of the improvements may be used without others.

Having thus described my invention, I claim:

1. An internal combustion engine including a crank-shaft having wrists, a plurality of inosculated engine-cylinders having pistons connected to the wrists of said crank-shaft, one of said cylinders in each plurality having an inlet passage common to the cylinders, and another of said cylinders in each plurality having an exhaust passage common to the cylinders, said passage closed by said pistons respectively, and opened by the pistons at the concluding portions of the power-strokes, said cylinders in each plurality communicating at their upper or outer ends, a carburetor, the pistons in each pair co-operating to compress a charge of mixed air and fuel, a power-driven blower to draw the charge of mixed air and fuel through said carburetor, communication between said blower and all of said inlet-passages, to enable the blower to scavenge and charge the cylinders, a vacuum fuel-tank, and a vacuum pipe leading from said tank to a point between said carburetor and said blower.

2. An internal combustion engine of the high-speed balanced class, having a two-throw crank-shaft formed with only two crank-wrists and giving the crank-shaft four evenly-spaced impulses at each revolution, said engine being of the two-cycle type and having eight valveless ported cylinders and eight port-controlling pistons therein, four of the cylinders being in line and forming a set of two pairs, and the remaining four cylinders also being in line and at right angles to the first set, one of the crank-wrists being coupled to a pair of pistons in each set, and the other crank-wrist being coupled to the remaining pairs of pistons, one cylinder in each pair having an exhaust port and the other having a fuel-intake port, one piston in each pair controlling the exhaust port and the other piston controlling the intake of fuel, a carburetor, means distinct from the carburetor and driven by the engine for supplying to all the intake-cylinders mixed air and fuel under pressure, to scavenge and recharge the cylinders, the pistons in each pair co-operating to compress the charge of mixed air and fuel, the compressed charge being spark-exploded, and manually-operable means adjustable while the engine is running for regulating the volume of burned gas displaced from the engine-cylinders by the fresh charges.

3. An internal combustion engine including a crank-shaft having diametrically opposite wrists, a plurality of engine-cylinders side by side and having pistons connected to each wrist of said crank-shaft, one of said cylinders in each plurality having an inlet-port common to both cylinders, and another of said cylinders in each plurality having an exhaust port common to said cylinders, said ports closed by said pistons respectively, and opened by the pistons at the concluding portions of the power-strokes, said cylinders in each plurality communicating at their upper or outer ends, a common charger for all of the cylinders, said inlet-ports extending around their respective cylinders, and annular chambers surrounding said inlet cylinders, said ports opening from said chambers into said inlet-cylinders, said charger communicating with said annular chambers, the latter in open communication with each other, the inlet-cylinders being juxtaposed, and arranged between the exhaust-cylinders, said inlet-cylinders with their annular chambers and said exhaust cylinders being all cast in one piece.

4. A high-speed automobile-engine of the flexible class having a crank-shaft, pairs of inosculated cylinders provided with pistons, said crank-shaft having wrists, the pistons in each pair being connected to the same crank, and the pairs of pistons being mutually balanced, the cylinders, pistons and crank-shaft being organized for effecting evenly spaced explosions in sufficient number at each revolution of the shaft to produce a continuous torque thereon one piston in each pair controlling the intake and the other controlling the exhaust, the cylinders having ports opened at the conclusions of the explosion-strokes, a carburetor, charging means for all of the intake-cylinders and driven by the engine and distinct from said carburetor for supplying mixed air and fuel under constant pressure to the intake-cylinders to displace burned gases in both intake and exhaust cylinders, and an adjustable regulating device for said charging means constantly available to the operator for varying over a wide range both the speed and the power of the engine by varying the pressure at which the mixed air and fuel is supplied to the intake-cylinders and thereby pre-determining the proportion of spent gases to be displaced by the incoming charges.

5. An engine having elements as set forth in claim 4, and having the movements of the pistons in each pair coincident throughout, and each exhaust-port having a great lead over the intake-port in the companion cylinder.

6. An engine having elements as set forth in claim 4, the crank-shaft being provided with only two wrists, said wrists being diametrically opposite, the inosculated pairs of cylinders being disposed in rows extending longitudinally of the crank-shaft, half of the pairs of pistons in each row being connected to one crank-wrist and half to the other, the cylinders in each row being angularly so disposed relatively to the remaining cylinders as to produce the evenly spaced explosions, and each exhaust-port having a great lead over the intake-port in the companion cylinder.

7. A high-speed automobile-engine of the flexible class having a crank-shaft, pairs of inosculated cylinders provided with pistons, said crank-shaft having wrists, the pistons in each pair being connected to the same crank, and the pairs of pistons being mutually balanced, the cylinders, pistons and crank-shaft being organized for effecting evenly spaced explosions in sufficient number at each revolution of the shaft to produce a continuous torque thereon, one piston in each pair controlling the intake and the other controlling the exhaust, the cylinders having ports opened at the conclusions of the explosion-strokes, a carburetor, a unitary charging means common to all the intake-cylinders and driven by the engine and co-operative with said carburetor for supplying, in unmeasured volume, mixed air and fuel under constant pressure to the intake-cylinders to displace burned gases in both intake and exhaust cylinders, a relief device for said charger, and a throttle device between said charger and the intake cylinders.

8. A two-cycle internal combustion engine having adjacent pairs of inosculated cylinders, one cylinder in each pair for intake and the other for exhaust, a chamber common to the intake-cylinders, said intake-cylinders passing through and being surrounded by said chamber, each intake-cylinder ported on every side into said chamber, means driven by the engine for charging said chamber with mixed air and fuel under pressure, port-controlling pistons in said cylinders, and a crank-shaft driven by said pistons.

9. An engine having the construction set forth in claim 8, in which the exhaust-cylinders have ports having great lead over the intake-ports.

10. A engine having the construction set forth in claim 8, in which the intake-cylinders are water-jacketed above said chamber, the latter underlying the water-jacketing.

11. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, a carburetor, means driven by the engine and distinct from the carburetor for charging the cylinders through said inlet-passages at constantly maintained pressure, and manually-controlled means between the charging means and the engine-cylinders, for regulating the pressure of the charge, to scavenge the cylinders to varying extents by forcing varying charges of mixed air and fuel thereinto at constantly maintained pressure.

12. An internal combustion engine including a crankshaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, the pistons in each pair co-operating to compress the charge, means for exploding the charge, a carburetor, a common charger distinct from the carburetor and also distinct from the engine and connected to the engine to be driven thereby and having means to scavenge and charge said cylinders through said inlet-passages, and adjustable means between the cylinders and the charger for regulating the pressure of the delivered charge and varying the volume of burned gas forced out of the engine.

13. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, the intake-cylinders being between the exhaust-cylinders, said cylinders in each pair communicating at their outer ends, a carburetor, a common engine-driven charger for all of the cylinders, said charger between said carburetor and the engine, said inlet-passages extending around their respective cylinders, and chambers surrounding said inlet-cylinders, said passages opening from said chambers into said inlet-cylinders, said charger communicating with said chambers.

14. In an internal combustion engine, the combination of a crank-shaft having diametrically opposite wrists, four pistons connected to each wrist, radiating rows of paired cylinders for said pistons, said rows placed in angular relation to produce crank-shaft impulses all evenly spaced, the cylinders in each pair being in communication at their outer ends, one of them having only an inlet-port, and the other having only an exhaust-port, a carburetor, and a power-driven charging means between said carburetor and said cylinders, said ports closed by the pistons and opened at the conclusion of the power-strokes of the pistons, said charging means provided with regulatable means to scavenge the cylinders by forcing mixed air and fuel through said inlet-ports.

15. A two-cycle balanced high-speed internal combustion engine, having, in combination, a shaft having two wrists, said wrists being diametrically opposite, a system of radiating engine-cylinders arranged four in a row, each row composed of two pairs of cylinders, a piston in each cylinder, pitmen divergent from the wrists and connecting each wrist to a pair of pistons in each row, a multiple of two pitmen being side by side upon each wrist, the radiating rows being relatively inclined so that a multiple of two evenly-spaced impulses are imparted by the pistons to the shaft at each revolution of the latter, one cylinder in each pair having an intake-passage and the other having an exhaust-passage, said passages being opened and closed by the pistons at the conclusion of their power-strokes, and engine-driven means for scavenging and freshly charging each pair of cylinders.

16. A two-cycle balanced high-speed internal combustion engine, having, in combination, a shaft having two wrists, said wrists being diametrically opposite, a system of eight engine-cylinders arranged four in each of two rows, one row radiating at an angle of ninety degrees to the other, each row composed of two pairs of cylinders and each cylinder having a piston, four separate pitmen side by side upon each wrist, two of the pitmen extending to adjacent pistons in one of the rows and the two remaining pistons upon each wrist extending to adjacent pistons in the other row, all of the cylinders in each row having an echelon arrangement with respect to the cylinders in the other row, one cylinder in each pair having an intake-passage and the other having an exhaust-passage, said passages being opened and closed by the pistons at the conclusion of their power-strokes, a carburetor, engine-driven charging means connected between said carburetor and the engine-cylinders, and manually-regulatable means for varying the extent of displacement of burned gas by fresh charges in the inosculated cylinders.

17. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, a carburetor for pre-mixing air and fuel, and power-driven charging means having an adjustable relief valve and co-operating with said carburetor and connected to deliver the mixed charge through said inlet-passages of the engine, to scavenge and charge the same, the pistons in each pair co-operating to compress the charge of mixed air and fuel, each piston having a connecting rod, four rods being separately articulated to each wrist, in staggered relation.

18. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, a carburetor, a power-charging means distinct therefrom and co-operating therewith and connected to deliver the charges through said inlet-passages of the engine, to scavenge and charge the cylinders, said charging means between the carburetor and the engine, and means between the carburetor and the engine for uniformly regulating the pressure of all the charges entering the engine from the charging means.

19. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends and co-operating to compress the charge of air and fuel, a carburetor, a power-charging means co-operating therewith and connected to deliver the charges under constantly maintained pressure through said inlet-passages of the engine, to scavenge the cylinders and supply charges thereto, pressure-regulating means in the form of a bypass around the charging means and a valve in said bypass to open and close the same, and manual means to operate said valve, to vary the extent to which the charge displaces the burned gases in the cylinders.

20. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each plurality having an inlet-passage common to both cylinders, and another of said cylinders in each plurality having an exhaust-passage common to said cylinders, said passages closed by said pistons respectively, and opened by the pistons at the concluding portions of the power-strokes, said cylinders in each plurality communicating at their outer ends, a carburetor, a power-charger co-operating therewith and connected to deliver the charge under constantly maintained pressure through said inlet-passages of the engine, and pressure-regulating means in the form of a bypass around the charger and a manually-operable valve controllable at will in said bypass to open and close the same, a throttle-valve being also provided between said charger and the engine.

21. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an inlet-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, said exhaust-passages formed to be opened by their pistons substantially before the respective inlet-passages are opened by their pistons, each of said inlet-passages extending all around its cylinder, and manually-regulatable power-driven means to scavenge the cylinders by means of a charge of mixed air and fuel maintained at constant pressure.

22. An internal combustion engine including a crank-shaft having diametrically opposite wrists, a plurality of rows of radiating paired engine-cylinders having pistons connected to each wrist of said crank-shaft, said rows placed in angular relation to produce crank-shaft impulses all evenly spaced, one of said cylinders in each pair having an intake-passage common to both cylinders, and another of said cylinders in each pair having an exhaust-passage common to said cylinders, said passages closed by said pistons respectively, and opened by the pistons at the concluding portions of the power-strokes, said cylinders in each pair communicating at their outer ends, said exhaust-passages formed to be opened by their pistons substantially before the respective inlet-passages are opened by their pistons, each of said intake-passages extending all around its cylinder, each intake-cylinder being surrounded by a chamber, the cylinder-wall forming the inner wall of said chamber, and said intake-passage forming an opening in said wall between said chamber and the cylinder, and said chamber provided with an intake-orifice, and means for supplying mixed fuel and air through said chamber to said cylinders in unmeasured volume at constantly maintained pressure.

23. A two-cycle balanced high-speed internal combustion engine, having, in combination, a shaft having two wrists, said wrists being diametrically opposite, a system of eight engine-cylinders arranged four in each of two rows, one row radiating at an angle of ninety degrees to the other, each row composed of two pairs of cylinders and each cylinder having a piston, four separate pitmen side by side upon each wrist, two of the pitmen extending to adjacent pistons in one of the rows and the two remaining pistons upon each wrist extending to adjacent pistons in the other row, all of the cylinders in each row having an echelon arrangement with resect to the cylinders in the other row, one cylinder in each pair having an intake-passage and the other having an exhaust-passage, said passages being opened and closed by the pistons at the conclusion of their power-strokes, and engine-driven means for scavenging and freshly charging each pair of cylinders.

24. An internal combustion engine including a crank-shaft having diametrically opposite wrists, a plurality of engine-cylinders side by side and having pistons connected to each wrist of said crank-shaft, one of said cylinders in each plurality having an inlet-port common to both cylinders, and another of said cylinders in each plurality having an exhaust-port common to said cylinders, said ports closed by said pistons respectively, and opened by the pistons at the concluding portions of the power-strokes, said cylinders in each plurality communicating at their upper or outer ends, a common charger for all of the cylinders, said inlet-ports arranged around their respective cylinders, and annular chambers surrounding said inlet-cylinders, said ports opening from said chambers into said inlet-cylinders, said charger communicating with said annular chambers, the inlet-cylinders being juxtaposed, and arranged between the exhaust-cylinders.

25. Engine constructed according to claim 15, in which the four engine-cylinders in each row are cast in one piece, and integral intake-chambers surrounding the intake-cylinders, the latter being between the exhaust-cylinders.

26. Engine according to claim 15 in which the intake-cylinders are between the exhaust-cylinders, each intake-cylinder being surrounded by a fuel-supply compartment, each intake-cylinder being integral with its supply-compartment and also with its associated exhaust-cylinder, and an intake-manifold arranged transversely of the rows of cylinders and supplying all the intake-cylinders.

BURNHAM C. STICKNEY.